United States Patent [19]
Masaru

[11] Patent Number: 5,402,629
[45] Date of Patent: Apr. 4, 1995

[54] MOWING MACHINE AND STRUCTURE FOR DISCHARGED MOWED GRASS

[76] Inventor: Tsuda Masaru, 2250-2, Ooaza Takahagi, Hidaka-shi, Saitama 350-12, Japan

[21] Appl. No.: 98,318
[22] PCT Filed: Apr. 24, 1992
[86] PCT No.: PCT/JP92/00540
§ 371 Date: Nov. 24, 1993
§ 102(e) Date: Nov. 24, 1993
[87] PCT Pub. No.: WO93/04574
PCT Pub. Date: Mar. 18, 1993

[30] Foreign Application Priority Data

Aug. 30, 1991 [JP] Japan .................. 2-298598
Jan. 30, 1992 [JP] Japan .................. 4-054469

[51] Int. Cl.$^6$ ............................... A01D 34/52
[52] U.S. Cl. ............................ 56/17.2; 56/249; 56/294; 56/320.2
[58] Field of Search .............. 56/17.2, 249, 253, 294, 56/320.2, DIG. 12, DIG. 17, DIG. 19, DIG. 20

[56] References Cited

U.S. PATENT DOCUMENTS

| Re. 25,810 | 6/1965 | Postlewait et al. ........... 56/294 X |
| 468,075 | 2/1892 | Wood ................. 56/DIG. 12 X |
| 902,187 | 10/1908 | Warrenfeltz ............ 56/DIG. 17 X |
| 1,348,471 | 8/1920 | Aspinwall ............... 56/294 |
| 1,381,358 | 6/1921 | Sparks ................. 56/249 X |
| 4,989,676 | 2/1991 | Rogers ............... 56/DIG. 12 X |

FOREIGN PATENT DOCUMENTS

| 48-80338 | 10/1973 | Japan . |
| 54-170339 | 12/1979 | Japan . |
| 61-32925 | 7/1986 | Japan . |
| 0064316 | 1/1989 | Japan . |
| 0315307 | 1/1991 | Japan . |
| 0337821 | 4/1991 | Japan . |
| 0415267 | 8/1934 | United Kingdom ............ 56/294 |

Primary Examiner—George A. Suchfield
Attorney, Agent, or Firm—Armstrong, Westerman, Hattori, McLeland & Naughton

[57] ABSTRACT

A mowing machine having a plurality of recessed-blades-carrying mowing plates (2), each having a plurality of projections (3) each provided with a front cutting edge (4) formed at the front end and also having sharp recessed blades (5) provided in fixed positions slightly receding from the front end and between said projections. The blades are fixed to the outer periphery of a rotary weeding body (10) in such positions recessed blades (5) of one plate deviate from those of the others in rotational phase so that recessed blade all together sweep the whole periphery of said rotary weeding body (10) which is provided on the vehicle body rotatably in the forward and reverse directions. A grass sweeper (25) is provided on the vehicle body in a position higher than the support shaft so as to be in proximity to or in elastic contact with said rotary weeding body for enabling simultaneous grass sweeping, mowing, and grass collection in cooperation with a rotary grass removing body (55) even when the machine is driven either of the forward and reverse directions. The rotary weeding body (10) is controlled in rotational operating speed and composed of a support shaft (24) and rotary weeder (9) which are in the structure capable of being disassembled from each other. All mowing plates are attachable to or detachable from the machine and replaceable simultaneously and quickly.

10 Claims, 10 Drawing Sheets

MOWING MACHINE AND STRUCTURE FOR DISCHARGED MOWED GRASS

BACKGROUND OF THE INVENTION

1. Field of the Invention

This invention relates to a mowing machine, and more particularly, to a mowing machine including a motor provided on a vehicle body on which a weeding rotary body having on the outer circumference thereof a plurality of recessed-blade-carrying mowing plates is rotatably supported, and further including both a structure for removing the weeds which become entangled in a rotary weeding body while it is turned and a structure for simultaneously replacing the plurality of recessed-blade-carrying mowing plates by another set of object plates.

2. Description of the Related Art

In the past it has been preferable to mow and grade simultaneously but plain mowing plates could not be used for very long because they are easily broken. It is not useful to grade more soil than is necessary by a large machine provided with a plurality of thick blades. International Patent Application PCT/JP, 89/01206, proposed by MASARU TSUDA, discloses one conventional apparatus which shows the reformation of plain blades which are easily damaged.

Since the operational speed of this prior art weeder is set to a low level which does not allow the lawn grass to be cut, the weeding is performed with a very small quantity of broken pieces of lawn grass and broken pieces of hardskin-carrying weeds left adhering to the edges of the weeder.

As a result, the uncut lawn grass impinging upon the mass of the cut lawn grass and weeds adhering to the blades of the weeder is thereby repulsed or slips thereon, and does not even directly touch these blades, and the quantity of the broken pieces of lawn grass and weeds adhering to and winding around the blades tends to increase over time. This makes it necessary to interrupt the weeding operation and remove the grass adhering to the weeding plates and rotary weeding body.

Besides, the aforesaid front edges which serve to maintain the recessed blades sharp are dull, so that the weeding performed near the position of the projections is not as completely performed as near the location of the recessed blades.

Therefor, to more effectively carry out weeding, it has become necessary to adjust the rotational phase of a plurality of recessed blades so as to make it possible to sweep over a predetermined range in the rotating outer circumferential area of a weeding rotary body without permitting a gap in coverage.

If the recessed blades are excessively positioned on the rear side with respect to the front edges, the leaves and stalks of lawn grass come in a bunch into the clearances in front of the recessed blades and among the projections, so that the weeds on the front side thereof are protected by these leaves and stalks and left uncut. Conversely, if the recessed blades are excessively positioned on the front side, even the projecting portions of solid objects, the sizes of which are larger than the distance between two adjacent projections, crash directly into the sharp recessed blades in many cases.

Therefore the recessed blades are easily damaged, and it becomes difficult to maintain the sharpness of the back blades.

Moreover, if the projections are formed to have a small length, the effect thereof in loosing the entangled weeds on a lawn decreases, and such projections lose effectiveness in catching a thick and hard stalk of a weed, which is often encountered on a lawn, and floating its root.

In addition, a preferable operation speed of the rotary weeding body in this prior art apparatus is not clearly defined.

According to these proposed techniques, the height at which the weeds are mowed is regulated mainly by varying the distance between a support shaft and the mowing plates in the structure of the rotary weeding body.

In order to wash or polish this apparatus, it is necessary that the rotary weeding body be removed with the support shaft from an apparatus body, or that the mowing plates may be removed one by one.

Namely, it is inconvenient to subject the apparatus to a washing or polishing operation.

The above-mentioned patent application does not include a proposal for providing a multifunction weeder, for example, a weeder having a plurality of types of weeding plates from which weeding plates having suitable types of blades are selected in accordance with the conditions at the job site.

There exist lawn mowers and grass cutters having mowing plates formed in a circle. Since these apparatuses have no function of selectively mowing types of grass softer than lawn grass, they are not the same kind of apparatuses as the apparatus disclosed in the above publication. In short, there are no concrete proposals for employing the techniques, in a lawn mower and a grass cutter, for attaching and detaching a plurality of grass cutting plates simultaneously to and from a rotary mowing body or removing entangled grass from the grass mowing plates while the rotary weeding body is turned.

The reasons for the above reside in the following.

Out of the blades and stalks of various kinds of grass, those of lawn grass are generally the thinnest and most flexible but they have a hard skin and are difficult to mow.

Therefore, when lawn grass impinges directly upon a mowing blade moving at a high speed, it presses the cut weeds and lawn grass which have already adhered to the front end portion of the blades and cuts and rubs them off before the lawn grass impinging upon the mowing blades has been cut off.

Such action occurs continuously while a rotary weeding body is rotated so that the cut weeds and lawn grass adhering to and wound around the mowing blades can be ignored while the mowing blades are sharp, i.e., and effective.

If such action appears on a rotary weeding machine, the mowing plate is easily broken because it is supported on a narrow center part.

Devices having blades similar to that of the blades on the weeding plates used in the present invention include a hedge trimmer used mainly for cutting off the twigs of a tree, and a miniaturized hedge trimmer used for mowing the grass in a small area.

Namely, the apparatus disclosed in PCT/JP, 89/01206 and the machine for removing weeds in lawns according to the present invention do not have any general points in common with any other types of grass cutters, lawn mowers and hedge trimmers regarding the function, operation, effect and objects thereof.

SUMMARY OF THE INVENTION

The present invention is directed to a machine for mowing lawn grass at high speed, and for weeding and grading, in addition to removing the weeds on lawns. The present invention consists basically of a rotary weeding body which is connected to a motor provided on a chassis on which the rotary body is rotatably supported, and which is provided on its outer circumferential portion with a plurality of recessed-blade-carrying mowing plates, each of which are composed of an edged tool manufacturing plate material, such as a steel plate or a stainless steel plate. Each plate has a plurality of projections, each plate provided with a front edge provided among the projections with the recessed blades which are recessed rearward more than about half of the distance between two adjacent projections. The support shaft of the rotary weeding body is adjustable to a specified level above the ground, and picks up the cut-grass and efficiently ejects the grass by means of a structure for discharging the grass, and ensured long uninterrupted weeding operation time. The afore-said discharging structure and the structure for replacing the rotary weeder are preferably provided on a vehicle body having a rotary weeding machine.

Therefore, strong tips or wedge-shaped projections in cross-section are formed at the front end portions of a plurality of projections and the recessed blades are made sharp in positions which are close to a line passing the front ends of the projections, which does not cause the bunting of the leaves and stalks of lawn grass to occur in each space between two adjacent projections and in front of the recessed blade in between.

Thus, the recessed blades are provided so that they contact weeds directly so as to carry out the mowing thereof easily. If the recessed blades are too close to the mentioned line, the effect thereof in loosening the entangled lawn grass decreases, as previously mentioned, so that the recessed blades are readily damaged and unable to float through the thick stalks of weeds.

Accordingly, the recessed blades are preferably provided so that the distance between the front end of each thereof and a line passing the front ends of the projections is substantially set back a distance greater than about half the distance between two adjacent projections.

If the recessed blades are formed in this manner, the greater part of solid objects having sizes typically larger than the distance between two adjacent projections does not directly impinge upon the recessed blades which are away from the line passing the front end of the projections by a distance larger than the radius of such a large object, so that the recessed blades are not damaged.

If the front edges and recessed blades are formed so as to extend upward and downward, respectively, it becomes convenient, when the length of the front edges decreases due to the abrasion thereof with the distance between the front ends of the recessed blades and a line passing the front ends of projections thereby becoming smaller, to regain a proper level of this distance. This proper level can be obtained again by grinding only the lower surfaces of the recessed blades so as to put back the front end thereof.

Since lawn grass is soft and has a hard skin, it is not cut with the blades on the mowing plates of which front edges has a predetermined width at a low speed. The lawn grass in front of a projecting blade is pushed down, and separated from the lawn grass, which has been intertwisted therewith, in front of an adjacent recessed blade, becomes able to contact the recessed blade easily. As a result, weeds having thick and hard stalks and wide leaves are also caught in the spaces among the projections, and floated weeds with their roots exposed are mowed with the blades on the following mowing plates provided with recessed blades provided between a number of projections.

Since the projections on these recessed-blade-carrying mowing plates repulse a solid object the size of which is larger than the distance between two adjacent projections, the recessed blades are protected.

Even when the front edges eat slightly in to the earth, the recessed blades are rarely damaged. In this case, the earth is scooped so that the earth leveling effect can also be expected, and the mowing blades are able to cut the lawn at high speed.

It is necessary that the height of these mowing plates be regulated in accordance with the length of object lawn grass and the kind and degree of growth of object weeds.

According to the present invention, the height of the mowing plates is set by regulating the height above the ground surface of a support shaft of a rotary weeding body rather than the height above the ground surface of the rotary weeding body itself, and mainly by regulating the height of the wheels when speeding up the mowing operation.

It is desirable that the mowing speed of the mowing plates be set regulatable in accordance with the hardness of lawn grass and weeds in each season and the sharpness of the mowing blades.

In order to set mowing plates, the number of which is a multiple of 2, on a rotary weeding body, the position of the projections occupied thereby at the time of rotation of the rotary body of one of two adjacent mowing plates is set in accordance with that of the recessed blades occupied thereby at such a time on the other.

If, in this case, the width of the recessed blades is greater than that of the front edges, the portion of grass which is above a plane of a certain height above the ground surface is necessarily mowed evenly with the sharp recessed blades. Consequently, no part of the lawn grass is left uncut.

The mowing plates are desirably fixed to the rotary body in this manner, such that the whole of the portion of object grass which is above a predetermined plane can be mowed.

When the recessed blades provided among the front edges are formed at the front end portions alone of the mowing plates, the rotary weeder is operated with the rotary body turned forward at all times, and this rotary weeder is operated mainly for selectively mowing the grass on a lawn.

However, when such recessed blades provided among the front edges are formed at the rear end portions as well of the mowing plates, the same operation can be carried out by turning the rotary body in a reverse direction.

In addition, while the rotary weeder is operated with the rotary body turned forward, and, while the rotary weeder is operated with the rotary body turned backward, the rear end portion of the mowing plates with respect to the direction of rotation thereof are rubbed against the surface of a lawn so as to sweep off the grass adhering to the back blades from an opposite side thereof. The devices which effectively sweep cut grass from the blades during a mowing operation are (1) a grass sweeper attached to a chassis so that the grass sweeper is close to the outer circumferential surface of a mowing plate provided on the circumferential surface of the rotary weeding body, and (2) a grass sweeper brought into resilient contact with the outer circumferential surface of a weeding plate so as to scrape off the cut pieces of lawn grass and weeds adhering to the mowing blades. Since these devices prevent the build-up of entangled grass, it becomes possible to operate the rotary weeder continuously for long periods of time.

However, providing such a grass sweeper in a low position on the front side of a mowing section is not preferable because such a grass sweeper pushes and inclines the grass to be cut at an angle at which the recessed blades impinging upon the grass do not easily bite there into.

Adding to that, the grass sweeper is desirably provided in a position where it will not disturb the rotating wind which blows off the cut grass toward the grass collectors over the rotary weeding body, and it is desirable that the grass sweeper be provided at least at a higher position than that of the supporting shaft.

The apparatus in which the rotary body can be turned both forward and backward, as mentioned above, is sometimes operated with the front and rear sides of the chassis reversed, and, in such a case, the collection of object grass is carried out in two directions.

Therefore, this apparatus is provided with a mowed grass discharge space above a rotary weeding body, a grass sweeper below the mowed grass discharge space, motor above the grass sweeper, and front and rear grass collectors for collecting the mowed grass where the grass collector is positioned on the opposite side with respect to the direction of rotation of the rotary body. If these grass collectors are detachably formed, a grass mowing operation can be carried out speedily, and the cleaning of the mowing blades can be done easily.

During an operation of the apparatus, both a grass sweeping effect and an effect of mowing weeds on a lawn can be obtained.

Moreover, because the position of a grass ejecting wall which divides the current of the rotating wind that is caused by the rotation of the rotary weeding body is determined by the rotating direction as either forwardly or reversely of the rotary weeding body, it is necessary that the position of grass ejecting wall should be changeable. When the rotary weeding body is rotated forwardly, the front grass ejecting space, that is, the space between the rotating outer circumference of the rotary weeding body and the front grass ejecting wall, is necessarily wide and spreads upward to a predetermined range, and the rear grass ejecting wall is preferably close to the outer circumference of the rotary weeding body as the grass guide space, that is, the space between the outer circumference of the rotary weeding body and the rear grass ejecting body, should be narrow.

Therefore, when the rotary weeding body is reversely rotating the position of the front and the rear grass ejecting wall should be changed to the opposite positions in order to collect the mowed grasses.

Because this changing of position is preferably carried out at once to a predetermined position and secured thereby, the rotating supporting bodies are integrally secured to the grass ejecting walls, thereby constituting a rotary grass removing body.

If a mower or a machine for removing weeds on a lawn is provided with a reel type rotary weeding body divided into a support member carrying support shaft, and one or two rotary weeders fixed unitarily at one or a plurality of supporting means, engaged with the support members and formed detachably with respect to the support shaft, and provided in each support member, which is fixed to the mowing plates, with a shaft bore opened to a width at least equal to the diameter of the support shaft, so as to extend outward toward a position between two adjacent mowing plates, or a plurality of rotary weeders combined with each other at the opposed support members thereof to form a structure for interchanging rotary weeders. The cleaning, maintenance, polishing, repairing, changing of use and selective employment of the mowing blades can be carried out speedily and easily on a job site.

This structure for interchanging rotary weeding members provides the functions mentioned above of a single weeding apparatus of mowing lawn grass and removing weeds on a lawn can be changed speedily.

Automating the wheels or connecting the weeding apparatus to an automobile, so as to mow the weeds on a lawn by a remote control means, constitutes a more desirable method of improving the practicality of the present invention.

The rotary machine of the present invention supports mowing plates at its ends, so that the importance of toughness of the mowing plates decreases and allows the possibility of making the mowing plates thinner.

And as the supporting disk shaped rotor protrudes slightly from its circumferential edge that the configuration prevents cut grass from intruding onto the upper surface thereof, in addition, the rotating shaft becomes free from adhering mowed grasses and the short part of the skirt, that is, the upper most portion makes out the grass ejecting spaces.

Although a motor is used as a prime mover, it is clear that some other kind of prime mover, for example, an internal combustion engine, may also be utilized.

In addition, it is an object to control the rotating speed of the mowing plates by some apparatus as a motor controller, axle, clutch and so on.

BRIEF DESCRIPTION OF THE DRAWINGS

All of the accompanying drawings are reduced scale drawings of an embodiment of the present invention, wherein:

FIG. 1–4 show an example of a plurality of recessed-blade-carrying mowing plates;

FIGS. 15-17 are a partial sectional views illustrating a structure for vertically regulating a wheel, wherein;

FIGS. 22-23 show a perspective view of parts of the rotary weeding body shown in FIG. 21;

FIGS. 24-26 illustrate an example of a fitting type rotary weeder, wherein:

FIGS. 27-28 are assembling drawings of a two-part combined type rotary weeding body wherein:

DETAILED DESCRIPTION OF THE PREFERRED EMBODIMENT

The present invention will now be described with reference to the accompanying drawings.

Referring to FIGS. 1-4, a plurality of recessed-blade-carrying mowing plates 2, each having a plurality of projections 3 and each provided with a font edge 4 formed at the front end and also having sharp recessed blades 5 provided in fixed positions slightly receding from the front end between said projections, are preferably rugged in construction and sharp to prevent breakage by a solid object like a small stone, when it crashes directly to the mowing plate, as shown in FIGS. 1-4. The front ends have a predetermined width forming either a straight line or an arc on its corner. The sectional view of the projections is wedge shaped, and their lower surfaces are shaped to extend upward by grinding or pressing in order to prevent them from crashing into a grass sweeper.

If lower surfaces of the recessed blades are shaped to extend upward, any shock caused by impact with some solid object is smaller than that of extending them downward in the object operation of mowing the weeds on lawns, and for grading, the blades are not damaged as much as they would be if they extended downward.

Figure 1:
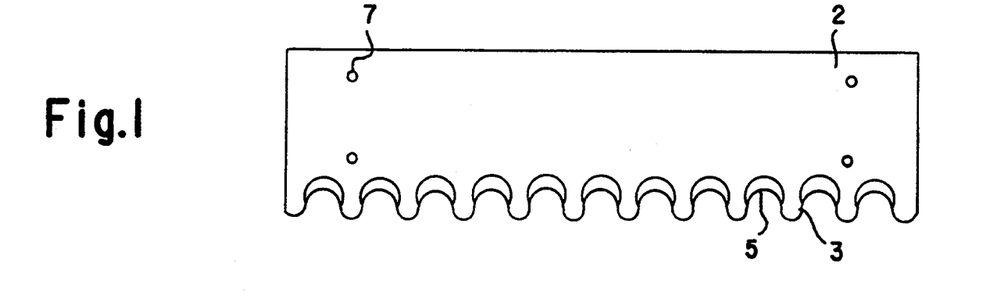
FIG. 1 is a bottom view of an example of the mowing plate.
Figure 2:
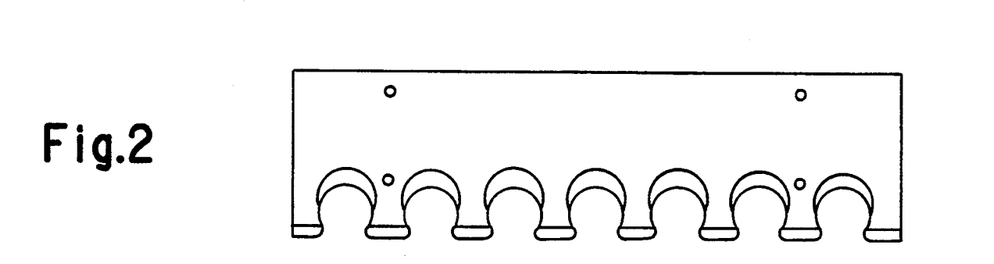
FIG. 2 is a bottom view of an example of the mowing plate.
Figure 3:
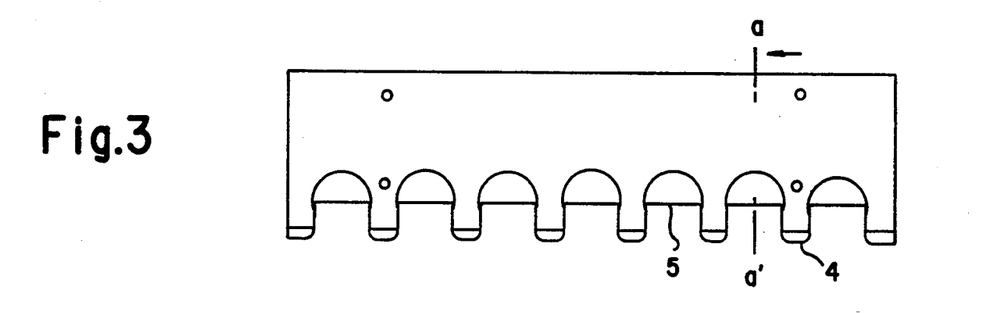
FIG. 3 is a bottom view of an example of a mowing plate.
Figure 4:
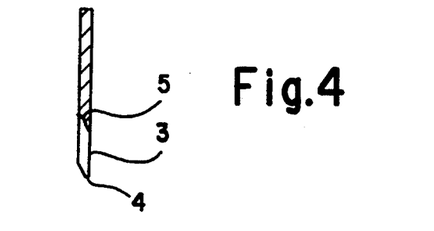
FIG. 4 is a sectional view taken along the one-dot chain line a—a' in FIG. 3.

Moreover, if the recessed blades are wider than the distance of two adjacent front edges, as shown in FIG. 2, the roots of the projections become weak and easily breakable such that the recessed blades should be shaped to have greater strength.

If the recessed blades extend upward, the groove for shaping recessed blades cut on the lower surface that the tips of cut grasses are prevented from adhering to upper surfaces of the weeding plate, but if the blades extend downward, the tips of the cut blades of grass are easy adhered to the upper surface of the mowing plates.

Thus, the projections and recessed blades are shaped in various forms according to the objects of operation, so that some preferred forms for a mowing machine for removing weeds on lawns will now be described.

Referring to FIGS. 5-10, a mowing plate formed by using a material, mainly an edged tool manufacturing material, such as a steel plate and a stainless steel plate, is provided with a plurality of projections 3 on which front edges 4 of a predetermined width are formed in parallel with one another so that the front ends of the front edges face substantially in the direction of advance of the mowing machine. Sharp recessed blades 5 of a width at least not smaller than the thickness of the rhizomes to be mowed are formed, and a line passing between the rearmost portion of each recessed blades and the front ends of the projections is not less than about 30% and not more than about 200% of a distance between two adjacent projections 3 with the recessed blades facing in the direction of advance of the mowing machine.

Figure 5:
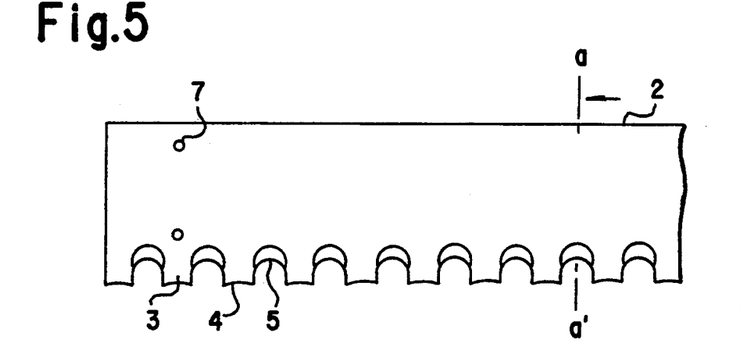
FIG. 5 is a partial plan view of the preferred embodiment of a plurality of recessed-blades-carrying mowing plates.
Figure 6:
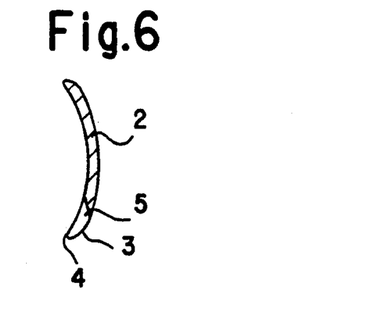
FIG. 6 is a sectional view taken along the one-dot chain line a—a' in FIG. 5.

Referring to FIGS. 5 and 6, each projection is formed arcuately at the front end thereof so that the intermediate portion of the front end is recessed backward, and the mowing plate is curved so that the inner surface thereof is recessed outward.

Figure 7:
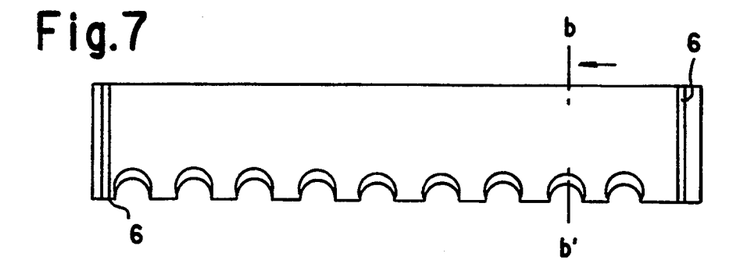
FIG. 7 is a plan view of the preferred embodiment of a plurality of recessed-blade-carrying mowing plates to which mounting members are fixed.
Figure 8:
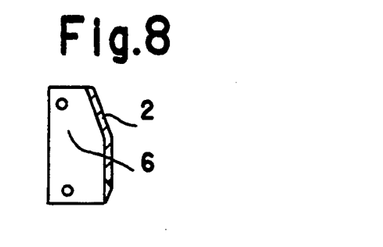
FIG. 8 is a sectional view taken along the-one-dot chain line b—b' in FIG. 7.

The front edges are formed so as to extend upward, and the recessed blades downward. Referring to FIGS. 7 and 8, mounting members 6 are provided on a mowing plate bent at the longitudinally intermediate portion thereof, and this mowing plate is fixed unitarily to support members 23, which are provided on a support shaft 24 of a rotary weeding body 10, via these mounting members.

Figure 9:
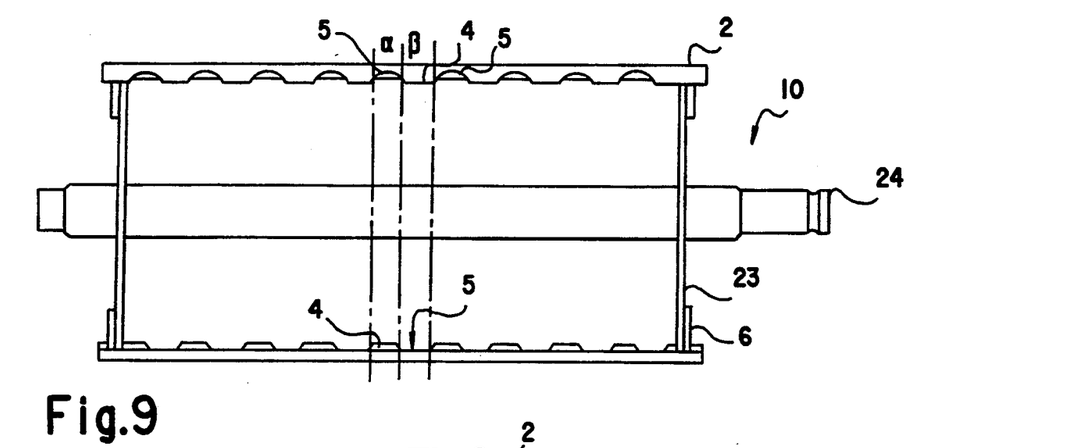
FIG. 9 is a front elevation of an example of a rotary weeding body.

In this arrangement, the rotary phase of the recessed blades of one of a plurality of recessed-blade-carrying mowing plates and that of the projections of the other are matched with each other (refer to a and b in FIG. 9).

This means that the recessed blades are arranged so that they are moved along the rotating surfaces of a plurality of recessed-blade-carrying mowing plates at the circumferential portion of the rotary weeding body with substantially no clearance left between the recessed blades and these rotating surfaces.

Figure 10:
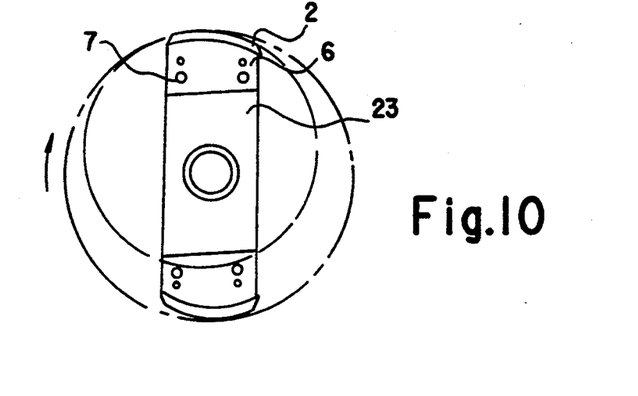
FIG. 10 is a side elevation of the rotary weeding body.

If the plurality of recessed-blade-carrying mowing plates is fixed, as shown in FIG. 10, with the rear end portion thereof along a smaller circle shown by a broken line in FIG. 10, and formed arcuately along a smaller circle shown by a broken line in FIG. 10, the mowing plates do not violently impinge upon a grass sweeper, which is adapted to contact mowing plates slightly and resiliently, when the rotary body is turned in the direction of an arrow.

In the case where weeds consisting mainly of clover are removed by using the plurality of recessed-blade-carrying mowing plates 2, each plate having, for example, recessed blades and projections of 6 mm in width with a distance between the rearmost portion of each recessed blades and a line passing the front end of the projections set to 5 mm, the mowing plates, which are provided on the outer circumferential portion of a rotary weeding body, are preferably set to a variable speed of 4-13 m/sec and reversely rotatable.

If the rotary body is turned at 7-8 m/sec while the recessed blades are new and sharp, lawn grass of a length of around 15 cm can be mowed substantially without hurting the lawn, even in late autumn, in which the skin of lawn grass is comparatively hard.

Accordingly, when the lawn grass of approximately 5 cm in length is apt to repulse the blades, and, even if the operation speed of the mowing plates is set to 10-13 m/sec, the weeds can be mowed without fatally damaging the lawn in many cases. However, in spring in which the skin of lawn grass is soft, the lawn is damaged in some cases unless the operation speed of the mowing plates is reduced to around 4-7 m/sec.

Therefore, it is important to form the mowing plates so that they can be regulated to an optimum operation speed on a job site since there are compound and incalculable factors, such as the degree of sharpness of the blades, seasonal conditions, kind and length of lawn grass, and the humidity and the water content of the atmosphere and lawn grass.

The embodiments of the machine for removing weeds on lawns which is provided with the above described the plurality of recessed-blades-carrying mowing plates will now be described with reference to the drawings.

FIG. 11-20 show a preferred embodiment of the present invention, in which a front and rear side-reversible mowing machine 1 for removing weeds on lawns is provided at both sides thereof with side plates, each of which is bent at its peripheral portion to a predetermined width to form a peripheral rim.

Figures 11, 12:
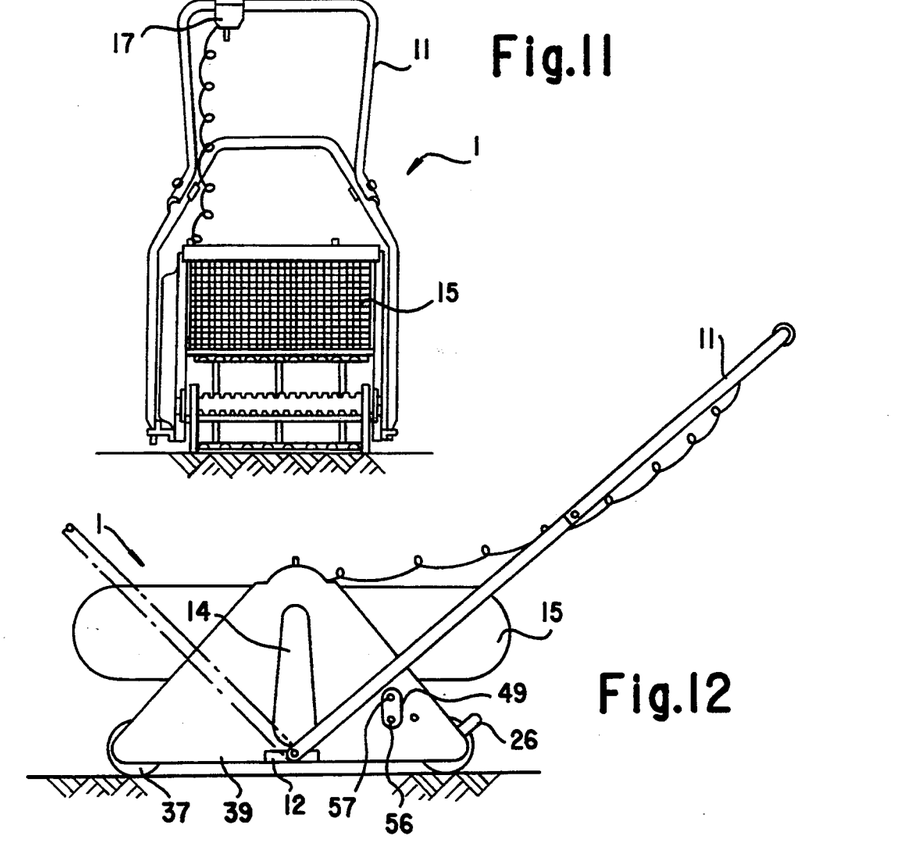
FIG. 11 is a reduced scale front elevation of an embodiment of a front and rear side reversible mowing machine.
FIG. 12 is a side elevation of the embodiment of FIG. 11.

From one side of a space between these side plates, wheels 37 serving both as front wheels and rear wheels, a rotary weeding body, which is positioned in the central portion of this space, and the other set of wheels 37, are provided. A support shaft 24 of the rotary weeding body 10 extends through each side plate 39, and a larger pulley 21 is mounted on the portion of this shaft 24 which projects from the outer surface of the side plate, just above the larger pulley 21. An end portion of a shaft of a motor 13 on the inner side of a motor covering wall 43 is extended through and projects from the side plate and a smaller pulley 22 is mounted on the projecting portion thereof, the larger and smaller pulleys being connected together by a belt 20.

Just under the larger pulley 21, a handle receiver 12 supports the lower end portion of a predetermined angle. If the handle is turned in the opposite direction, it can be held in a position shown by a two-dot chain line, and the machine can be moved in reverse.

Figure 13:
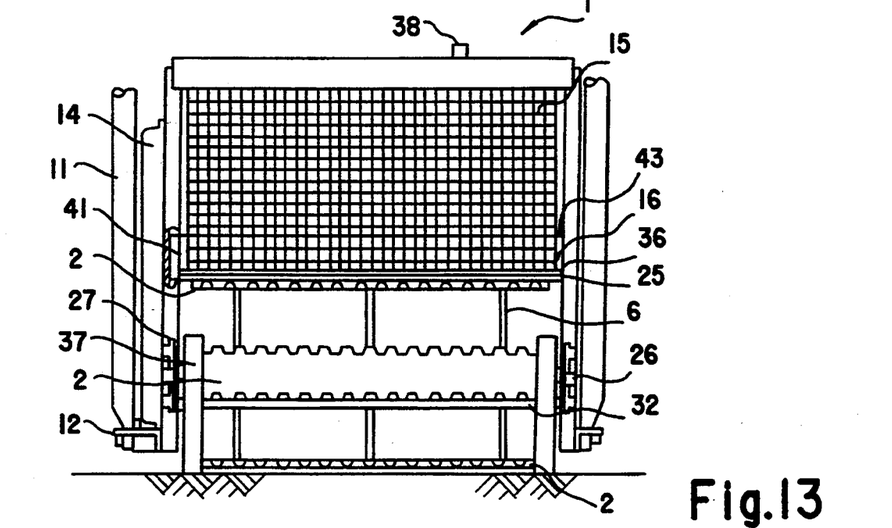
FIG. 13 is an enlarged front view of what is shown in FIG. 11.

In FIG. 13, in the space between the side plates, a shelf 36, the height of which is a half of that of the side plates, is provided so as to extend from one end of the space to the other except the intermediate portion thereof.

The ends of a grass sweeper are loosely fitted in slide cases 41 provided on the inner surfaces of both side walls at the level just above the outer circumferential track R of the rotary weeding body 10 provided in the middle of the weeder 6.

The cross-section of the grass sweeper 25 has an angled bar shape, and angled short pieces 46 are secured to the ends of the grass sweeper.

These short pieces are vertically slidably inserted into the lower portion of the slide cases 41 provided on the inner walls of the both side plates and downwardly pressed from thereabove by virtue of the elastic force of an elastic body 42 formed of rubber. A cover 47 prevents the elastic body 42 from coming off.

Figure 14:
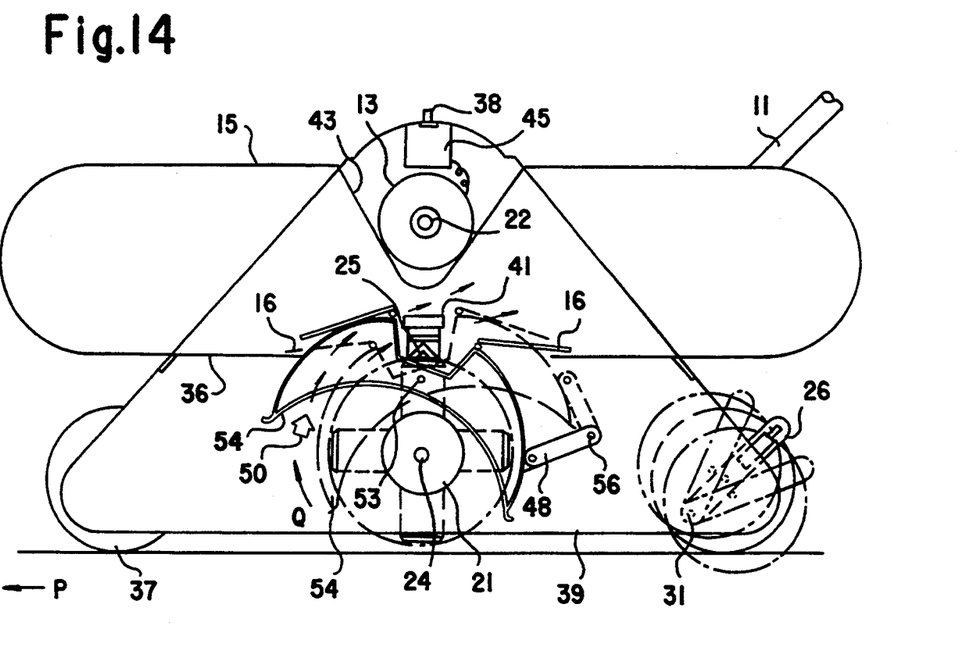
FIG. 14 is a side perspective view of what is shown in FIG. 13.
Figure 18:
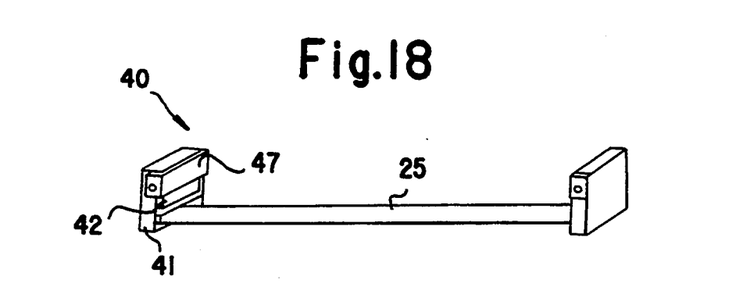
FIG. 18 is an assembly drawing of a grass sweeping device.
Figure 19:
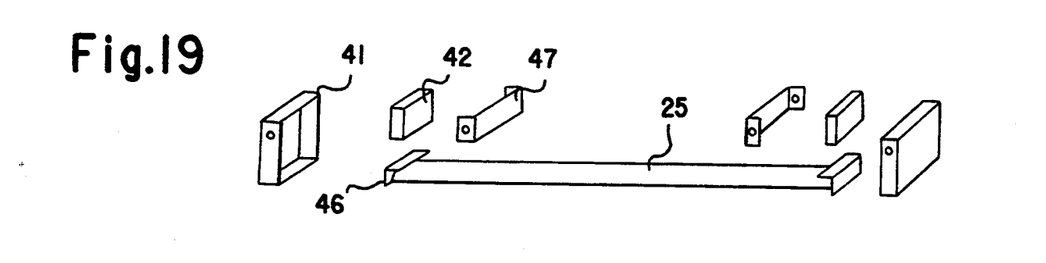
FIG. 19 is a perspective view of parts of the grass sweeping device.
Figure 20:
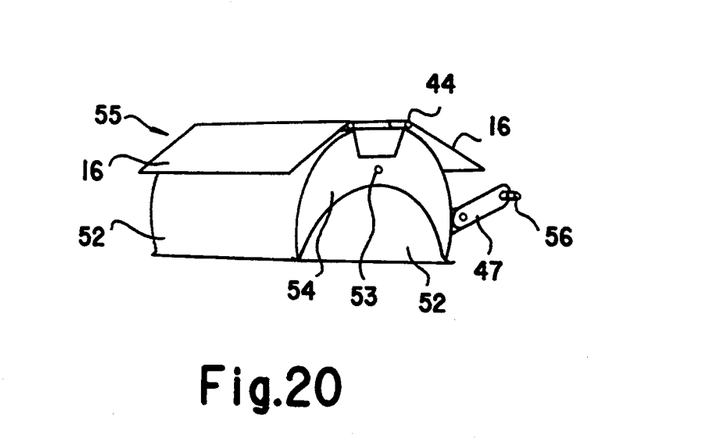
FIG. 20 is a perspective view of the rotary grass removing body shown in FIG. 14.

Thus, a grass sweeping device 40 is constructed as described above, and the grass sweeper 25 comes into elastic contact with a plurality of recessed-blade-carrying mowing plates 2 (FIGS. 14, 18 and 19).

A rotating shaft 53 rotatably supports rotating supporting bodies 54 just below the slide cases 41 provided on the inner surfaces of the side walls.

A pair of left and right rotating supporting bodies 54 are integrally secured to the left and right side ends of front and rear grass ejecting walls 52, thereby constituting a rotary grass removing body 55.

In the rear, a switching supporting body 48 is rotatable supported at one end thereof with respect to the side wall by means of a switching shaft 56 is fitted over either of two (upper and lower) projections on the outer surface of the side plate through a switching hole 57 to be secured thereto, thereby making it possible to adjust the position of rotary grass removing body 54 indicated by a thick broken lines or thick solid lines in FIG. 14 and FIG. 12.

Furthermore, an air door 16 is rotatably mounted at an upper end of the front and rear grass ejecting walls by means of a hinge 44, and the lower end edge portion of the air door 16 is located above the inner end edge portion of the afore-said shelf so as to come into close contact with the upper surface of the shelf when the rotary grass removing body 55 rotates to lower the grass ejecting wall, whereby an air flow is smoothly passed in a grass collecting direction, thereby facilitating collection of grass.

Therefore, the front and rear ejecting walls can simultaneously be rotated by operating the switching means 49 on the out side wall so as to maintain a wide grass ejecting space inside one of the grass ejecting walls allowing the inner surface of the other grass ejecting wall to approach the rotating outer circumference of the rotary weeding body. Therefore, if the rotary weeding body is rotated and halted by up-cut so as to maintain a grass ejecting space forwardly and upwardly of a rotating direction, when the rotary weeding body is driven in a direction indicated by an arrow Q, cut grasses are caused to fly in the grass ejecting space as shown by a small arrow and swept by the grass sweeper, whereby they are collected into a grass collector 15 provided in the rear, thus making it possible to carry out a weeding operation while collecting cut grasses to a sufficient extent.

There are various types of switching and halting means for the afore-said switching shaft, and it is easy to automatically control the rotation and halt of the rotating supporting body such as by coupling it to a servomotor to control the rotation of the rotating supporting body.

Moreover, it is also easy to manually or automatically control the rotating speed of the rotary weeding body by operating a motor controller 45 inside a motor covering wall 43 by means of a control dial 38 projecting upwardly and centrally.

Since this motor controller can continuously keep the weeding cycling speed of the plurality of recessed-blade-carrying mowing plates mounted on the rotary weeding body in the range from 0 to 25 m/sec, it is possible to carry out both mowing and weeding in the grass by selecting mowing plates.

Consequently, an embodiment of the present invention can be used as a mowing machine for carrying out mowing in a vast field when a self-propelled model is developed by using the afore-said automatic control.

In the mowing machine 1 for mowing in this example, the mowing height is regulated at the wheels 37 serving both as front wheels and rear wheels.

Figure 15:
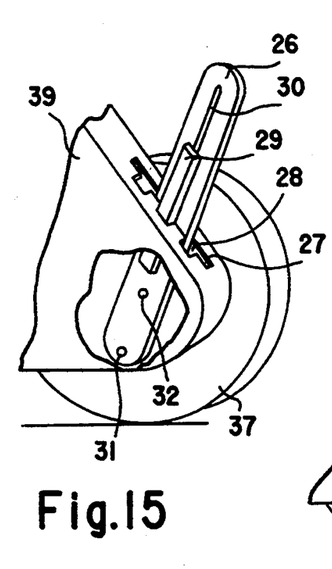
FIG. 15 shows a wheel set to a second mowing height.
Figure 16:
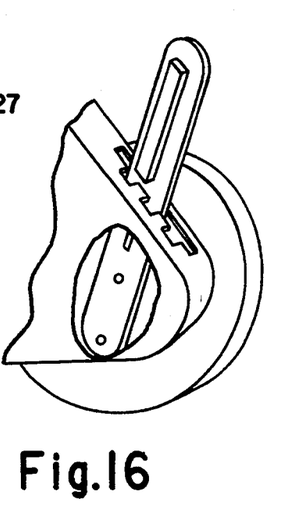
FIG. 16 shows the wheel being regulated to a third mowing height.
Figure 17:
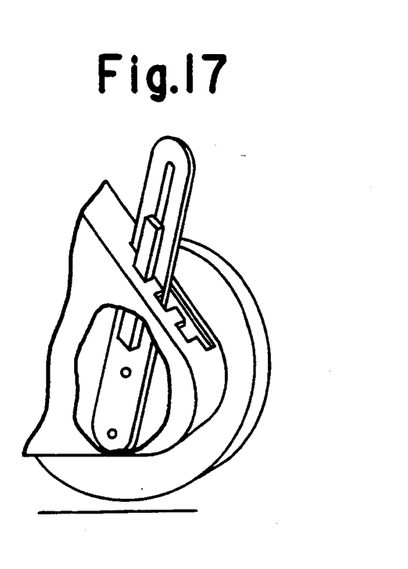
FIG. 17 shows the wheel finished being regulated to a third rowing height;.

For this purpose, both end portions of an axle 32 are fixed to lower portion of left and right regulators 26 consisting of metallic plates, and regulating shafts 31 are passed through the portions of the regulators 26 which are below these end portions of the regulators 26 which are these end portions of the axles, one end of each of the regulating shafts 31 being fixed to the inner surface of the relative side plate 39 (FIGS. 15, 16 and 17).

A slide slit 30 is made in the regulator 26 so as to extend from the intermediate portion thereof to the upper portion thereof. When a rocking member 29 formed slidably along this slide slit 30 is positioned in the uppermost portion of the slide slit (Refer to FIG. 17), the regulator 26 can be turned around the regulating shaft 31 from the upper end of a regulating bore 27 to the lower end thereof.

In order to shift the regulator 26 from a suitable position, for example, an intermediate step (FIG. 15) to the uppermost step, the locking member 29 is slid upward, and the regulator 26 is turned to upper side of locking recesses 28.

The locking member 29 may then be slid downward toward the uppermost locking recess 28 amount the three-step rocking recesses (FIG. 17).

Consequently, the wheel 37 serving both as a front wheel and a rear wheel is suspended higher by a level corresponding to that at which the axle 32 is lifted, and the mowing height is set to the position thus obtained.

Since the regulator 26 can be set firmly in any of the three-step locking recesses by carrying out the above-described operation, the mowing height of the mowing machine for mowing in this example can be set to one of three levels.

It is preferable that a return pressure be applied to the locking member in the downward direction via a resilient member, thus set can be operated more easily. The slide regulating unit in this example has a simple construction, and can be applied to the operation of a single wheel.

Figure 21:
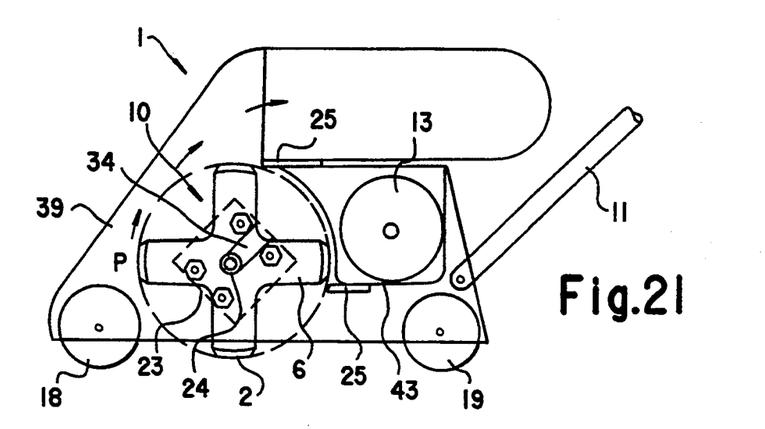
FIG. 21 is a schematic perspective profile map of an example of a unidirectional machine for removing weeds on a lawn.
Figure 22:
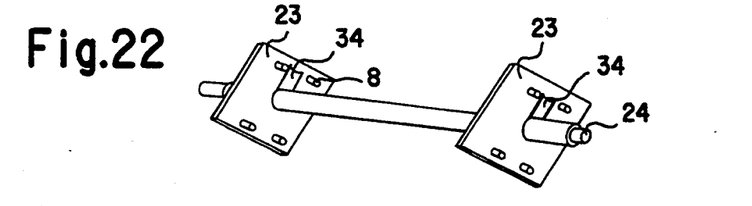
FIG. 22 shows a support shaft on which support members are provided unitarily therewith.
Figure 23:
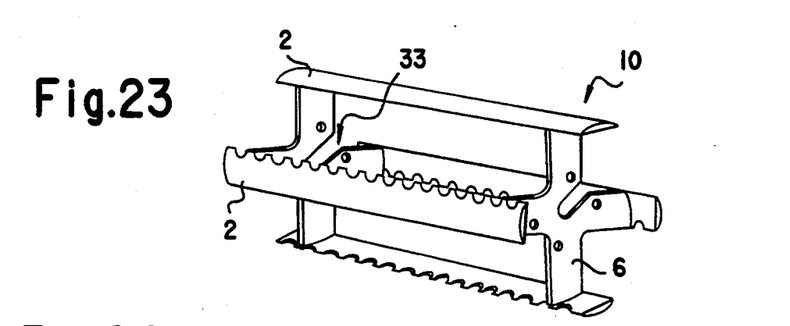
FIG. 23 shows a rotary weeder capable of being attached to and detached from the support shaft.

FIGS. 21, 22 and 23 illustrate another embodiment of the present invention in which a structure for replacing rotary weeder is applied. A mowing machine 1 is provided at both sides thereof with side plates 39 each of which is formed by bending a plate material at its peripheral portion to a predetermined width to obtain a peripheral rim thereon. In a space between the side plates, front wheels 18, a rotary weeding body 10 and upper and lower grass sweepers 25, a motor 13 covered with front and rear motor covering walls 43, and a rear wheel 19 are arranged in the mentioned order.

A larger pulley is provided on one outer side of the rotary weeding body, and a smaller pulley on the outer side of the motor 13, these larger and smaller pulleys being connected together by a belt and driven by the rotary weeding body.

The rotary weeding body is formed by engaging cross-shaped mounting members 6 adapted to fix four of a plurality of recessed-blade-carrying mowing plates thereto and consisting of a flat plate with support member 23, and mounting the resultant products detachably on the support shaft.

Specifically, a shaft bore in the central portion of the mounting member 6 is cut and opened to a width equal to the diameter of the shaft in the outward direction toward a position between two adjacent mowing plates to form an insert recess 33. Flat square support members 23 are fixed on the portion of a support shaft 24 on which the support members 23 contact the mounting members 6, and pad members 34 to be fitted in the cut and opened insert recesses 33 are attached to the support members 23.

In this example, each rotary weeder may be assembled by inserting the mounting member 6 at its insert recess 33 around the support shaft 24, inserting the four mounting holes in the mounting member around bolts 8 on the support member, bringing the mounting member and support member close to each other and tightening them with nuts.

It is clear that the rotary weeder can be removed from the support shaft by reversing these steps.

Therefore, all of the four mowing plates can be attached and detached simultaneously and simply, and the weight of the rotary weeding body in this example is well-balanced because of pad members 34, so that the balance of the rotation thereof is not lost.

According to the present invention, various types of blades can be selected since the rotary weeders can be easily interchanged.

Since rotary weeders having various diameters can be provided simultaneously, the operational speed of the mowing plates can also be changed.

Since interchangeable spare parts are available on a job site, the mowing plates can be replaced simply when worn out, and this enables a mowing operation to be carried out efficiently.

Since mowing plates can be attached and detached easily, the rotary weeding body can be disassembled and cleaned speedily and completely.

Figure 24:
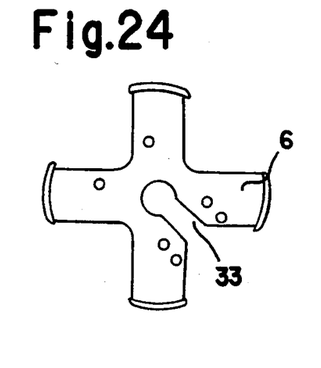
FIG. 24 is a side elevation of a rotary weeder.
Figures 25, 26:
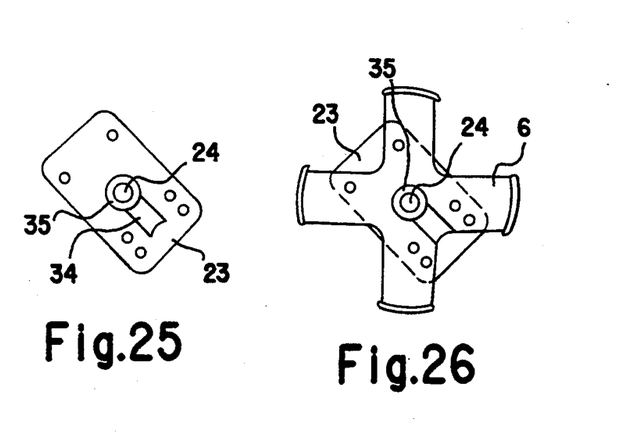
FIG. 25 is a side elevation of a support shaft provided with a support member.
FIG. 26 is a side elevation of the rotary weeder fitted on the support shaft.

FIGS. 24, 25 and 26 illustrate still another embodiment of the present invention, in which only parts of a rotary weeding body which are different from the corresponding parts of the previously described embodiment will be described.

A plurality of support members 23 are provided on a support shaft 24 of the rotary weeding body, and a ring 35 having a support shaft bore in the central portion thereof is fused unitarily to the support member 23 and support shaft 24. A central shaft bore in a mounting member 6 is made to a diameter which permits the shaft bore to be fitted around the ring 35, and it is cut and opened portion to be fitted around the support shaft, in such a manner that the cut and opened portion extend toward a position between two adjacent mowing plates 2 to form an instant recess 33.

Accordingly, the shaft bore in the central portion of the mounting member 6 in this example is fitted around a ring 35, so that the bolt holes in the mounting member 6 and those in the support member 23 are aligned with one another. Therefore, these two members can be combined with each other with bolts and nuts. Insert recesses are also provided.

Even if the shaft bores are large, the support shaft can be inserted in the central portions thereof, and all of the mowing plates can be set on the mounting members simultaneously by combining the mounting members unitarily with the support members. Moreover, these parts can be disassembled by taking the above steps of procedure reversely.

FIGS. 27-30 illustrate a fourth embodiment of the present invention, which shows an example of a rotary weeder formed with two identically shaped portions.

Figures 27, 28:
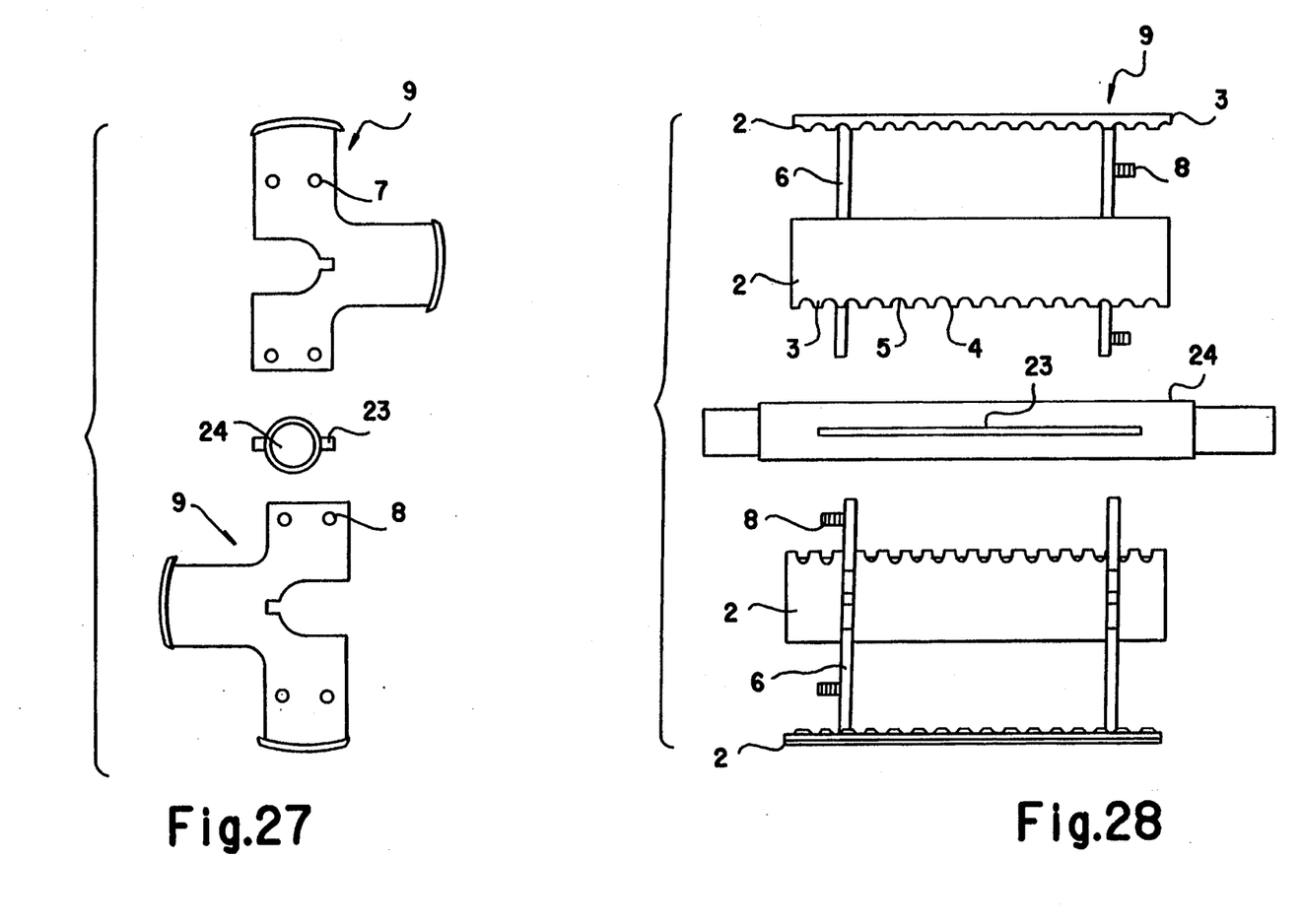
FIG. 27 is an exploded side elevation of the two-part combined type rotary weeding body.
FIG. 28 is an exploded front elevation of the rotary weeding body.
Figure 29:
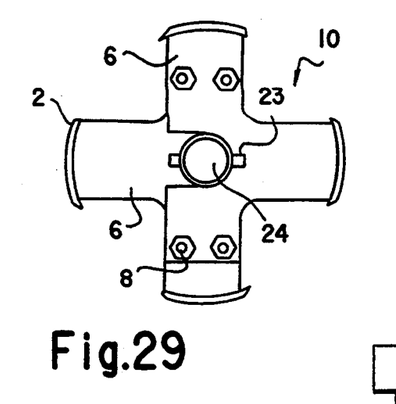
FIG. 29 is a side elevation of the rotary weeding body finished being assembled.
Figure 30:
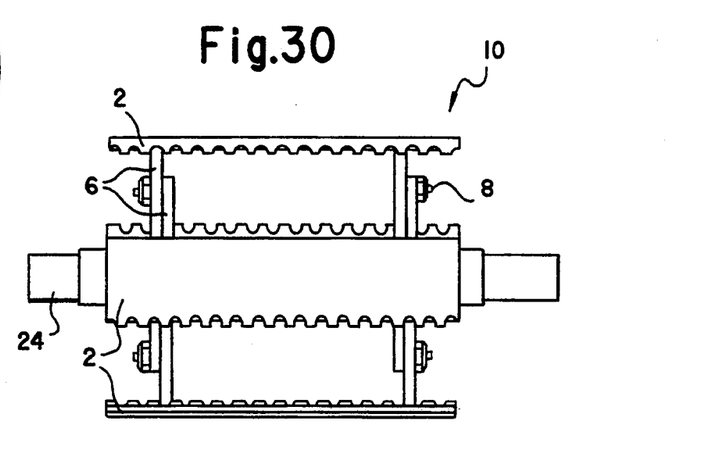
FIG. 30 is a front elevation of the rotary weeding body finished being assembled.
Figure 31:
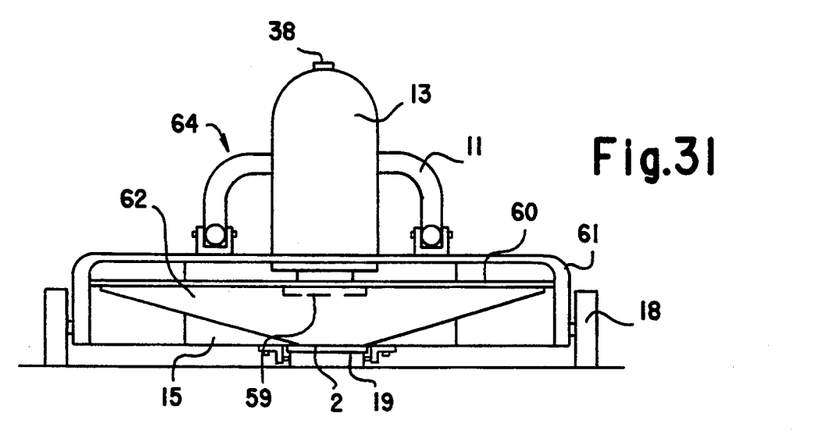
FIG. 31 is a schematic front elevation of a rotary mowing machine.
Figure 32:
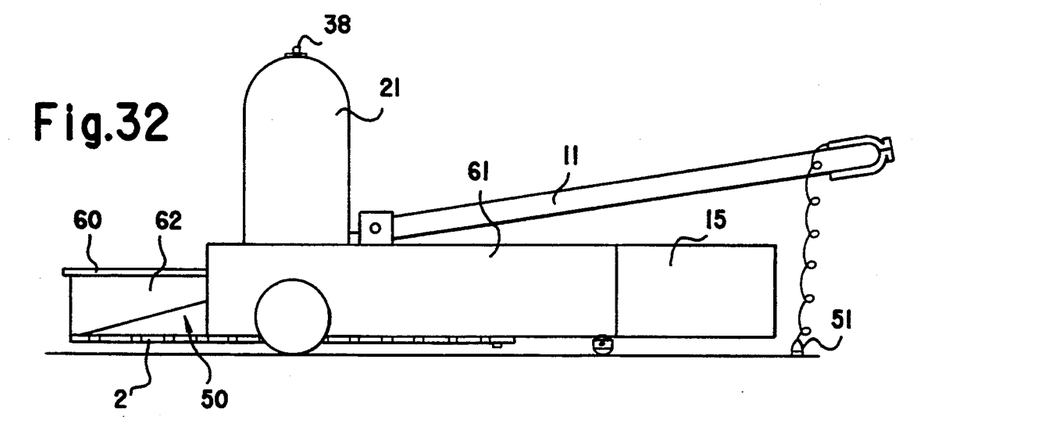
FIG. 32 is a schematic side elevation of the machine of FIG. 31.
Figure 33:
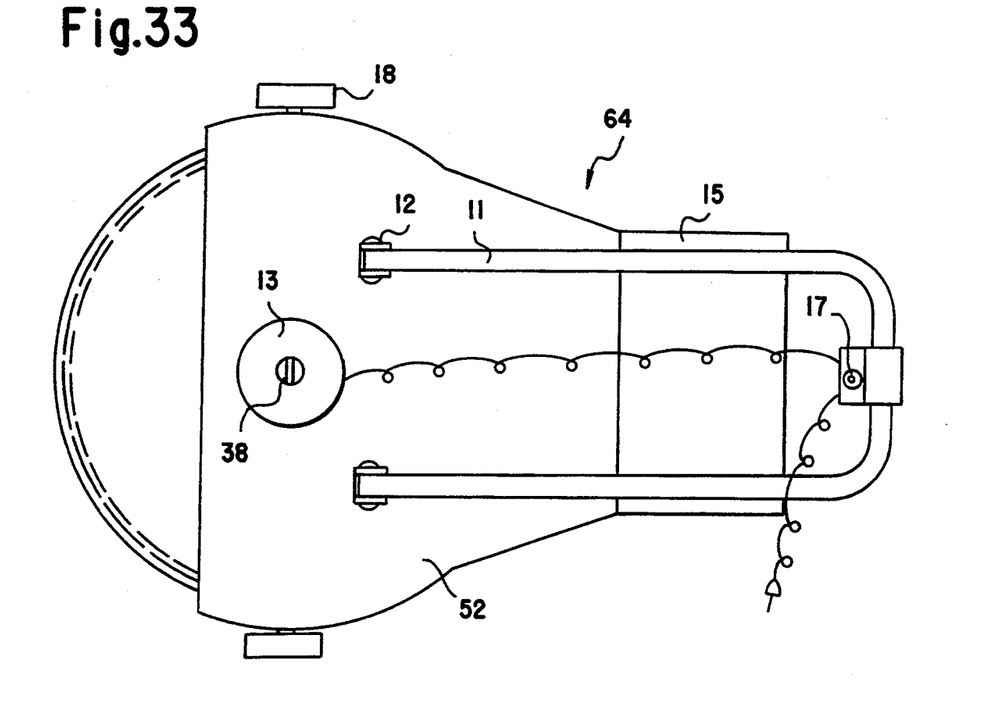
FIG. 33 is a schematic plan view of the machine of FIG. 31.
Figure 34:
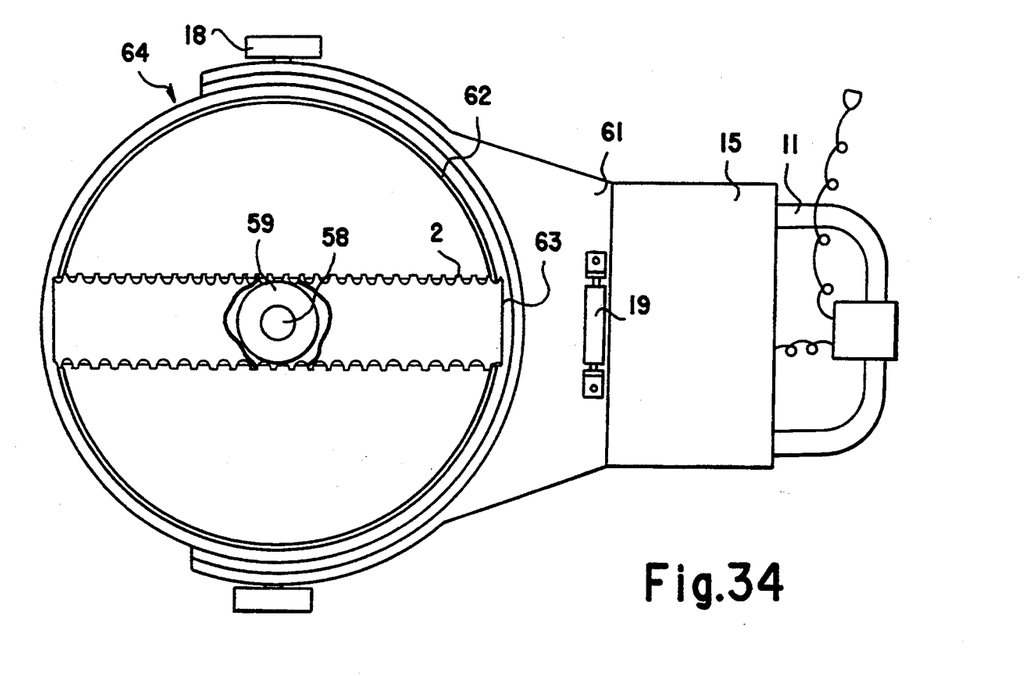
FIG. 34 is a schematic bottom view of the machine of FIG. 31.

A plurality of recessed-blade-carrying mowing plates are fixed to each of the mounting members each of which consists of a flat plate, and has a cut provided in the portion thereof which corresponds to one of ear-shaped support members 23 on both sides of a support shaft 24, and an insert recess 33 formed by cutting and opening a shaft bore in the mounting member.

Such two mounting members are mounted on the support shaft 24 so that the mounting members face in the vertically opposite directions and are set on each other from the left and right sides thereof with reference to the support members 23 on the support shaft 24, these mounting members are then combined tightly with bolts 8 and nuts.

It is clear that the two rotary weeder can be removed by disassembling the rotary weeding body by reversing this procedure.

As mentioned above, each of the two-part combined type rotary weeder can be formed to the same shape, so that this example is advantageous with respect to the manufacturing cost and the convenience of replacement of mowing plates.

Moreover, this example has a good weight balance and a good rotary balance.

FIGS. 31-38 illustrate a fifth embodiment of the present invention in which one of the mowing plates adapted to rotate forwardly and reversely for mowing operations is secured at the ends thereof to a supporting member 63 at the lowest portion of a skirt 62 of a rotary mowing machine 64.

Since it is secured at the ends thereof where the strongest force is applied, the mowing plate is difficult to break.

This rotor 60 has a disk shape, and its whole circumferential edge slightly protrudes from the securing portions of upper edge of the skirt 62. This configuration prevents cut grass from intruding onto the upper surface thereof.

In addition, the downward width of the skirt is not constant, and portions between the lowest portions that confront each other at 180 degrees smoothly incline to the uppermost portions.

The uppermost portions are located intermediately between the lowest portions, and therefore the uppermost portions also confront each other at 180 degrees as the lowest portions do.

A grass ejecting space 50 is produced between the lower edge of the upwardly cut portion of the skirt and the rotating surface of the mowing plate 1.

The rotating shaft of a motor 13 is put through the center of this rotor 60, and the shaft is secured to the rotor 60 by means of a securing nut 59.

Therefore, even if the above rotor 60 rotates at high speed, the lower edge of the skirt rotates along the same circumference and in a moderately inclined fashion in a vertical direction, and this reduces air resistance, and greatly increases the strength. Furthermore, reverse rotations removes entanglement of cut grass.

A front wheel supporting portion of the above mentioned rotor 60 and a rear upper portion thereof continuing from that supporting portion are covered by a rotor cover 61, and the motor 13 is mounted at the central upper portion thereof.

Left and right front wheels 18 are provided on the left and right sides of the motor 13, respectively, and a handle 11 is rotatably mounted on the left- and right-hand sides of the motor 13 slightly rearwardly thereof by means of a handle receivers 12. A switch 17 is provided at a grip portion of this handle 11, and forward and reverse rotations may be freely made by this switch. In the lower surface of the rotor cover 61, a cover is formed rearwardly from the rotating area of the rotor at the same level as that of the mowing plate 1 so as to be continued from the upper portion, and the cover constitute the bottom surface of a hood communicating with a rear grass collector 15. Furthermore, rear wheel 19 is mounted at the center and rearwardly of this bottom surface.

The two front wheels and the one rear wheel are constructed so as to be vertically adjustable up to a predetermined height, whereby it is possible to adjust the mowing height of the rotor, and it is clear that the mowing height of the rotor can be adjusted by means for adjusting the rotor vertically over a predetermined distance.

Thus, weeding or mowing of grass can be carried out by controlling a motor controller for adjusting the rotating speed of the mowing plate 1 to a suitable value in the range of 1 to 13 m/second by operating a control dial 38.

Figure 35:
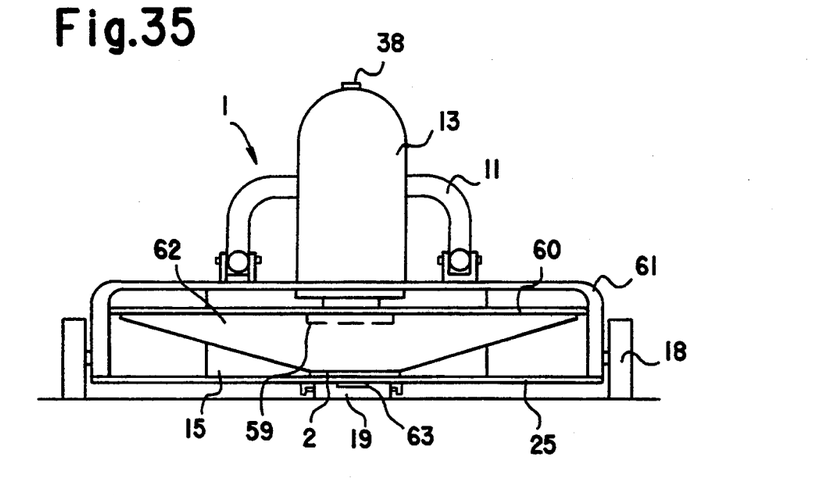
FIG. 35 is a front view of an example of a rotary mowing machine provided with a grass sweeper.
Figure 36:
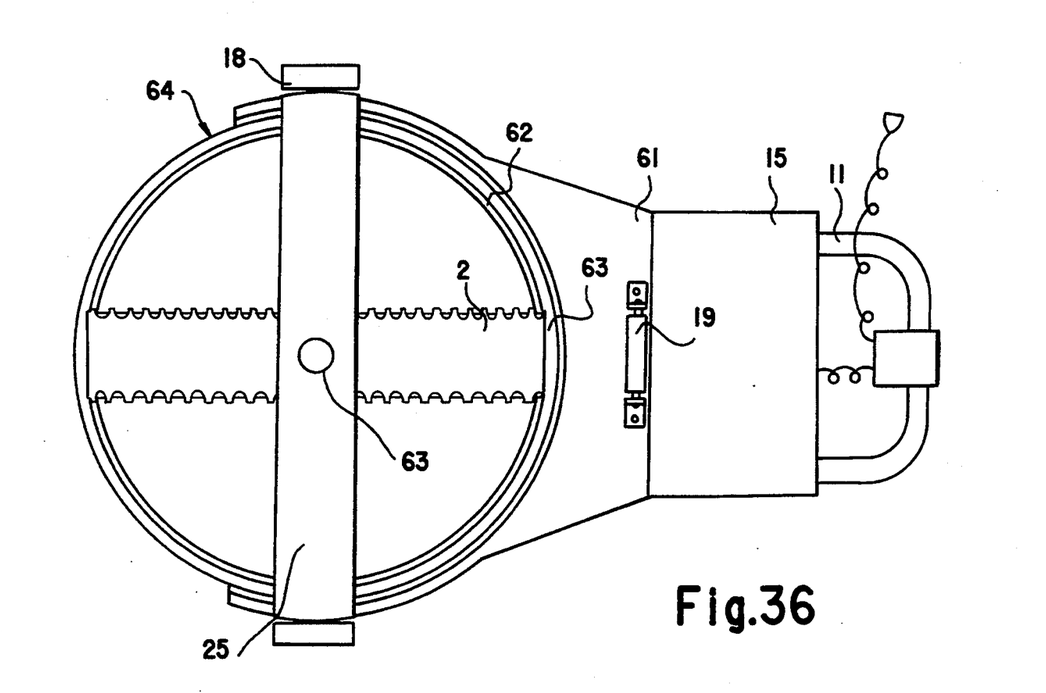
FIG. 36 is a bottom view of the machine of FIG. 35.

FIGS. 35 and 36 show one example in which the above embodiment is employed. In this example, an engaging shaft 65 provided at the center of a grass sweeper 25 on which a flat rectangular plate is integrally mounted on the lower end portion of the rotor cover 61 at the end thereof is rotatably fitted in a shaft hole formed in the center of a mowing plates 2, and while being made to approach or brought into contact with the grass sweeper, the rotor is driven to simultaneously carry out sweeping and clipping of grass.

It is preferable to form the flat rectangular grass sweeper in such a manner that the front or rear thereof is formed into a parabolic shape.

In this embodiment, it is possible to carry out weeding or mowing by rotating the rotor at low speed, and if a mowing plate with recessed blades instead of flat blades, is used, it is possible to carry out mowing at lower speed. This is because grass is caught between projection to thereby make it difficult for grass to slip. Moreover, it is preferable to carrying out mowing while rotating the rotor forwardly and reversely.

In the above embodiments, the mowing machine may be constructed into an automobile or to be drawn by a tractor to suitably carry out the afore-said weeding and grading, mowing or weeding in the lawn.

As described above, the mowing machine according to the present invention is not only capable of carrying out weeding and mowing by rotating the mowing plates at high speed but also capable of mowing on a lawn with lawn grass left unmowed by adjusting the suitable rotating speed of the mowing plates and grading on a golf course, and on a comparatively plain garden and farm, so that it is capable of saving the using amount of herbicide, or using nothing of it and reducing the environmental pollution.

What is claimed is:

1. A mowing machine for mowing grass on the ground, comprising:
   a vehicle body;
   a rotary weeding body rotatably supported on said vehicle body;
   a plurality of recessed-blade-carrying mowing plates located on an outer circumference of said rotary weeding body, each said plate having a plurality of projections and a plurality of recessed blades each provided between each said projection; and
   a motor mounted on said vehicle body and connected to said rotary body,
   wherein the phase of rotation of each said recessed-blade-carrying mowing plates is adjusted to allow said plurality of recessed blades to sweep over a predetermined range in the rotating outer circumferential area of said rotary weeding body without forming a gap in mowing coverage as said vehicle body travels along the ground.

2. A mowing machine as recited in claim 1, further comprising a grass sweeper provided on said vehicle body for removing cut grass from said rotary weeding body.

3. A mowing machine as recited in claim 1, wherein said plurality of projections have a plurality of front edges arranged in parallel with each other, the front edges forming dull blades of predetermined width, wherein each said recessed blade has a width greater than the diameter of a stem root of the grass to be cut and a depth of between 30% and 200% of the distance between each said projection.

4. A mowing machine as recited in claim 2, including an adjusting means for adjusting the mowing cycling speed of said plurality of recessed-blade-carrying mowing plates to a value between 4 and 13 meters/second, and further including a supporting shaft for supporting said grass sweeper.

5. A mowing machine as recited in claim 4, wherein said grass sweeper is supported by a plurality of cushions above said supporting shaft.

6. A mowing machine as recited in claim 4, wherein said grass sweeper is elastically brought into close proximity with said plurality of recessed-blade-carrying mowing plates.

7. A mowing machine as recited in claim 4, wherein said grass sweeper is elastically brought into contact with said plurality of recessed-blade-carrying mowing plates.

8. A mowing machine as recited in claim 7, wherein said mowing machine is of a forward and reverse advancing type, further comprising:
   a pair of rotating supporting bodies supported by a rotating shaft rotatably provided on supporting walls on the sides of said mowing machine;
   front and rear grass ejecting walls integrally secured to said rotating bodies on the sides of said mowing machine; and
   stopping means for stopping said rotating supporting means in a predetermined grass ejecting position.

9. A mowing machine as recited in claim 8, wherein a cut grass ejecting space is provided above said rotary weeding body,
   wherein said motor is provided above said space, and wherein grass collectors communicating with said space are provided forwardly and rearwardly of said rotary weeding body.

10. A mowing machine as recited in claim 1, further comprising a level adjusting mechanism for vertically adjusting the lowest level of said rotary weeding body when rotated.

* * * * *

UNITED STATES PATENT AND TRADEMARK OFFICE
CERTIFICATE OF CORRECTION

PATENT NO. : 5,402,629
DATED : April 4, 1995
INVENTOR(S) : Masaru Tsuda

It is certified that error appears in the above-indentified patent and that said Letters Patent is hereby corrected as shown below:

On the cover page, Item [54], line 2, "DISCHARGED" should read --DISCHARGING--.

Column 1, line 60, delete the second occurrence "and" and insert --are--.

Signed and Sealed this

Eighteenth Day of July, 1995

Attest:

BRUCE LEHMAN

*Attesting Officer*     *Commissioner of Patents and Trademarks*